Jan. 8, 1957  A. G. McDONALD  2,776,769
SELF LOADING BOAT TRAILER
Filed March 2, 1955  2 Sheets-Sheet 1
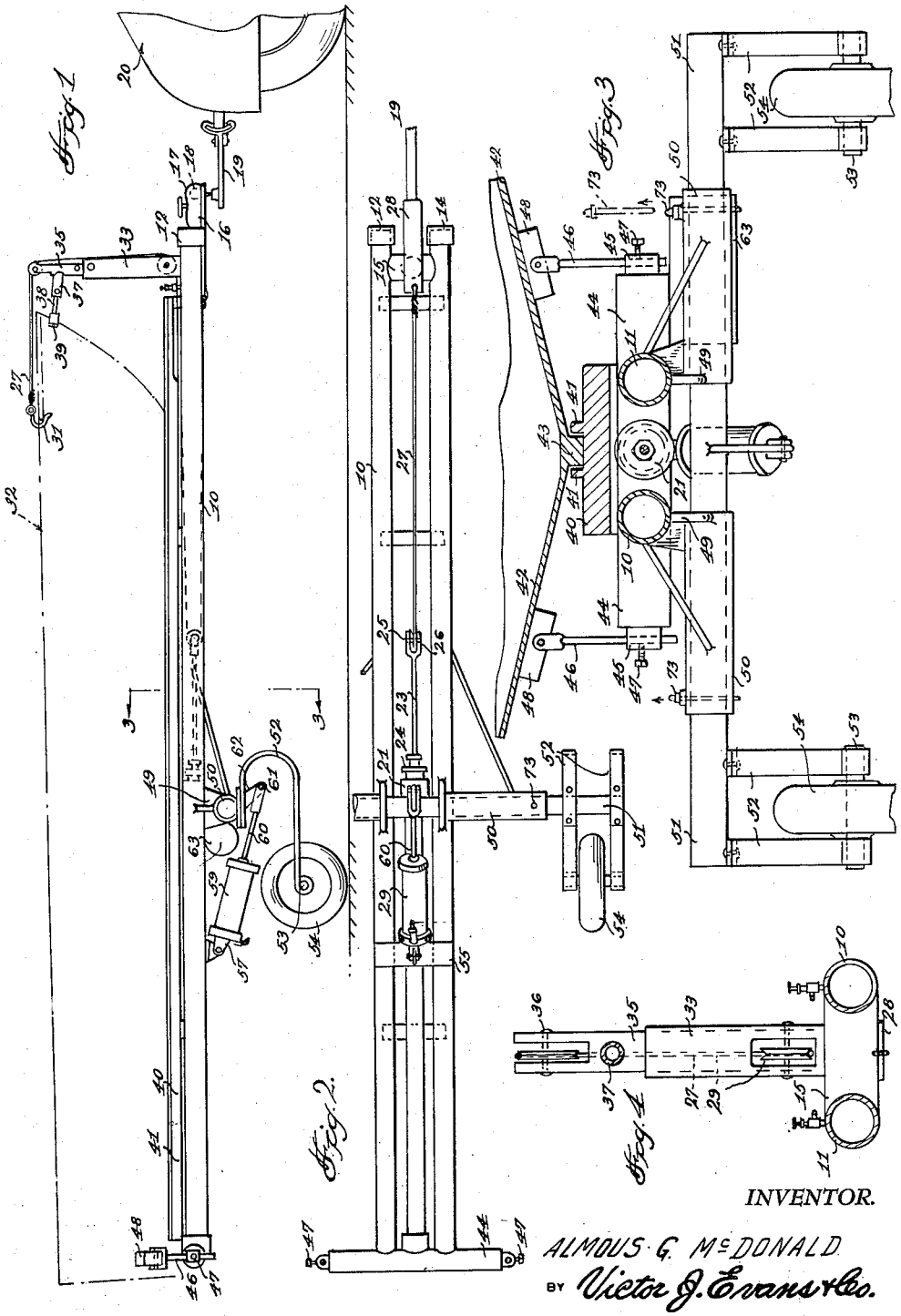
INVENTOR.
ALMOUS G. McDONALD
BY Victor J. Evans & Co.
ATTORNEYS Jan. 8, 1957 A. G. McDONALD 2,776,769
SELF LOADING BOAT TRAILER
Filed March 2, 1955 2 Sheets-Sheet 2
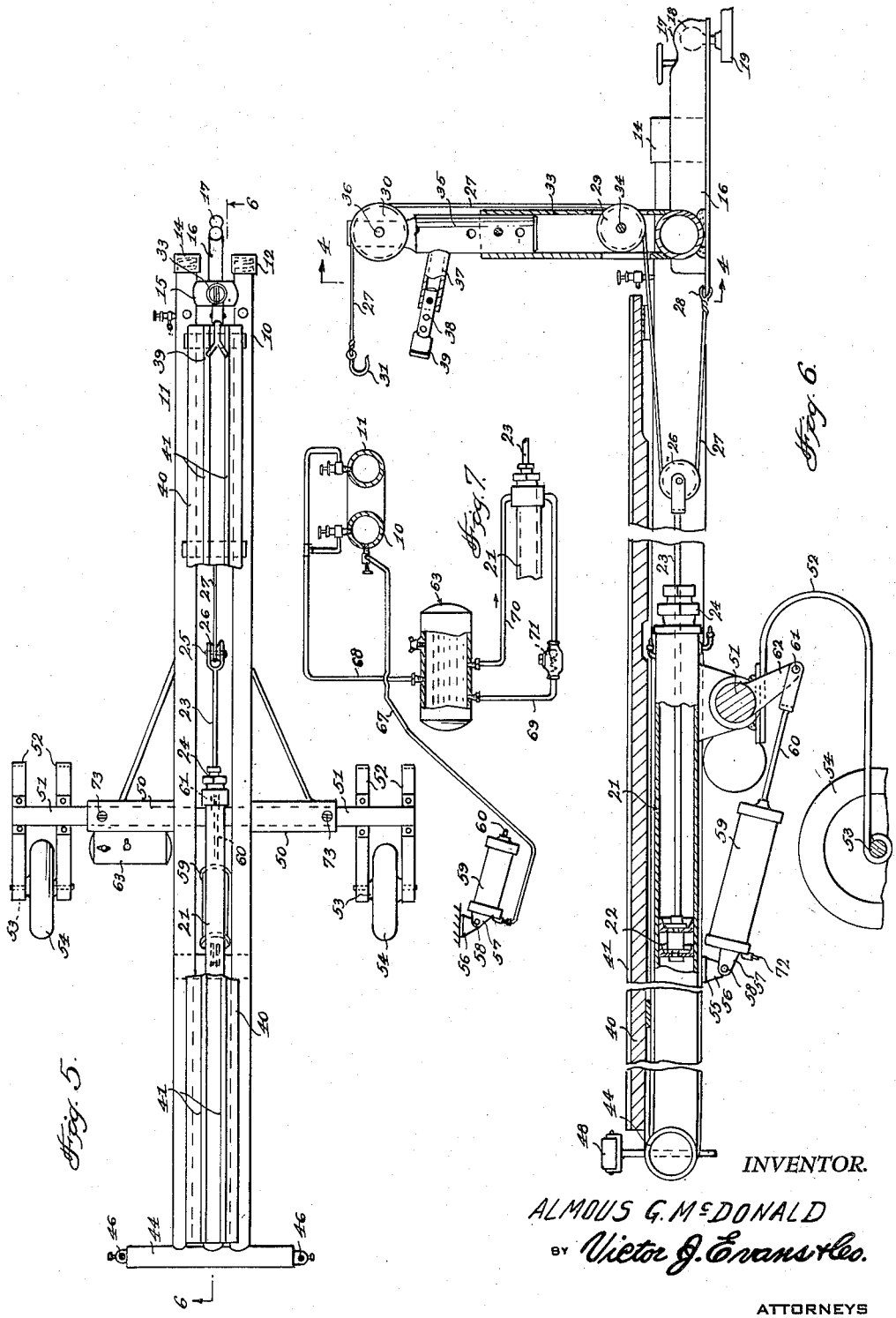
INVENTOR.
ALMOUS G. McDONALD
BY Victor J. Evans & Co.
ATTORNEYS United States Patent Office 2,776,769
Patented Jan. 8, 1957

2,776,769

SELF-LOADING BOAT TRAILER

Almous G. McDonald, Kingsville, Tex.

Application March 2, 1955, Serial No. 491,730

3 Claims. (Cl. 214—505)

This invention relates to a trailer, and more particularly to a self-loading boat trailer.

The object of the invention is to provide a trailer which will permit boats to be readily loaded thereon or unloaded therefrom.

Another object of the invention is to provide a boat trailer which is adapted to be attached to a towing vehicle such as an automobile or truck so that boats can be readily transported to any desired location, the trailer of the present invention including a mechanism for automatically loading a boat thereon.

A further object of the invention is to provide a boat trailer which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view of the boat trailer, constructed according to the present invention, and showing a boat in broken lines.

Figure 2 is a bottom plan view of the boat trailer, with parts broken away and in section.

Figure 3 is a sectional view taken on the line 3—3 of Figure 1.

Figure 4 is a sectional view taken on the line 4—4 of Figure 6.

Figure 5 is a top plan view of the trailer, with parts broken away and in section.

Figure 6 is a sectional view taken on the line 6—6 of Figure 5.

Figure 7 is a view illustrating the conduits which connect the tubes and tank and cylinders together.

Referring in detail to the drawings, the numerals 10 and 11 designate a pair of hollow elongated tubes, and the tubes 10 and 11 have caps 12 and 14 on their front ends. These caps 12 and 14 can be removed so that solidified carbon dioxide or Dry Ice can be placed in the tubes 10 and 11. A cross member 15 extends between the front ends of the tubes 10 and 11 and is secured thereto in any suitable manner, as for example by welding and extending forwardly from the cross member 15 and secured thereto is a tongue 16 which is provided with a socket 17 adjacent its front end, Figure 6. A bar 19 has a ball 18 arranged in engagement with the socket 17, and the bar 19 is adapted to be connected to the rear of a towing vehicle such as an automobile 20, Figure 1.

The boat trailer of the present invention further includes a cylinder 21 which is secured between the pair of tubes 10 and 11, Figure 6. The cylinder 21 has a movable piston or plunger 22 arranged therein, and a rod 23 has its rear end secured to the piston 22, and the rod 23 slidably extending through a head 24 on the front of the cylinder 21. A first pulley 26 is connected to the front of the rod 23 through the medium of a pin 25, and a cable 27 is trained over the pulley 26 and has one end connected to a stationary member 28 on the front portion of the trailer. The cable 27 is also trained over a pulley 29, and over a pulley 30, and the cable 27 has a hook 31 arranged thereon for engagement with the bow of a boat 32.

Extending upwardly from the cross member 15 is a vertically disposed post 33, and a pin 34 journals the pulley 29 in the post 33. An arm 35 is adjustably mounted in the upper end of the post 33, and the pulley 30 is journaled in the top of the arm 35 through the medium of a pin 36. An upwardly extending inclined lug 37 is secured to the arm 35, and a finger 38 is adjustably connected to the lug 37, Figure 6. A V-shaped steady rest 39 is secured to the member 38 and the steady rest 39 engages the front of the boat 32 so as to help steady the boat and maintain it in its proper aligned position.

Extending across the top of the trailer is a horizontally disposed platform 40, Figure 3, and extending upwardly from the platform 40 and secured thereto or formed integral therewith is a pair of spaced parallel longitudinally extending guide ribs 41 which receive therebetween the keel 43 which depends from the bottom 42 of the boat being handled.

Extending between the rear ends of the tubes 10 and 11 and secured thereto is a cross member or crosspiece 44, and brackets 45 are mounted on the ends of the member 44, Figure 3. Rods 46 extend upwardly from the brackets 45 and are held in their adjusted positions by means of set screws 47, and bearing blocks 48 are mounted on the upper ends of the rods 46 and engage the lower surface of the bottom 42 of the boat so as to help steady and support the rear of the boat when the boat is mounted on the trailer as shown in Figure 1.

Depending from the tubes 10 and 11 are braces 49, and a pair of hollow horizontally disposed transversely extending casings 50 are secured to the braces 49. A horizontally disposed rod 51 extends through the pair of casings 50, and spring members 52 have an end thereof secured to the rod 51. The spring members 52 support axles 53 which have ground engaging wheels 54 mounted thereon, Figures 1 and 3.

A strap 55 extends between the tubes 10 and 11 and is secured thereto, and an ear 56 depends from the strap 55, Figure 6. A link 57 has an end pivotally connected to the member 56 through the medium of a pin 58, and the member 57 has a cylinder 59 secured thereto. A suitable piston is arranged within the cylinder 59, and a rod 60 is secured to the piston which moves in the cylinder 59, there being a pin 61 pivotally connecting an end of the rod 60 to a lever 62 which is secured to the rod 51. Thus, by supplying hydraulic fluid or the like to the cylinder 59, the trailer can be pivoted or swung about a horizontal axis so as to help raise the rear end of the trailer as when a heavy boat is thereon.

There is further provided a tank 63 which is adapted to hold a suitable quantity of hydraulic fluid or oil, Figure 7, and the tank 63 may be secured to one of the casings 50. The tank 63 has a conduit 68 extending therefrom and the conduit 68 leads to the two carbon dioxide holding tubes 10 and 11, there being a conduit 67 extending from the tube 10 to the cylinder 59. Suitable valves are provided in these conduits wherever desired. A conduit 69 also connects the tank 63 to the cylinder 21, and a conduit 70 also connects the tank 63 to the cylinder 21, there being a check valve 71 interposed in the conduit 69.

Guide pins 73 are provided for maintaining the parts in their proper aligned position. The members 48 may be rollers for facilitating the movement of the boat onto and off of the trailer.

From the foregoing it is apparent that there has been provided a trailer which can be used for loading a boat such as the boat 32 thereon and then transporting the boat to any desired location. In use, the valves in the conduits shown in Figure 7 can be adjusted so that the cable 27 can be extended sufficiently to permit the hook 31 to be arranged in engagement with the front of the boat 32. Previously the tubes 10 and 11 are filled with carbon dioxide or Dry Ice and the tank 63 is filled with oil. Then, by opening the various valves, the carbon dioxide gas will be permitted to flow through the conduits 67 or through the conduit 68 and this gas will build up pressure in the interior of tank 63. Thus, the hydraulic fluid can be forced from the tank 63 through the conduit 70 and into the cylinder 21 to cause the piston 22 to move rearwardly whereby the rod 23 will be moved rearwardly to move the pulley 26 rearwardly. Thus, the cable 27 will be moved rearwardly to thereby cause the hook 31 to move forwardly and pull the boat 32 onto the platform 40 of the trailer. The keel 43 of the bottom 42 of the boat is guided between the ribs 41. The rollers 48 facilitate the movement of the boat onto and off of the trailer, and the rods 46 can be adjusted to different elevations to accommodate different sizes of boats. In the event that the boat is quite heavy, the rear end of the trailer may be tipped or tilted downwardly so that carbon dioxide gas can be permitted to enter the conduit 67 whereby the carbon dioxide under pressure will flow out through the line 67 and into the cylinder 59 to cause upward pivotal movement of the rear end of the trailer to raise the trailer and boat to the desired elevation. The steady rest 39 helps maintain the boat in its proper aligned position and the drawbar and hitch structure permits the trailer to be readily attached to a towing vehicle such as an automobile 20. By opening the proper valves the hydraulic fluid or oil can be permitted to flow from the cylinder 21 out through the line 69 back to the tank 63 so as to permit movement of the hook 31 rearwardly as when the boat is to be unloaded.

The tubes 10 and 11 thus act as storage tanks for the carbon dioxide and valves are provided for controlling the carbon dioxide's flow to the oil tank 63 whereby the oil will be forced into the cylinder 21 and carbon dioxide can be directed to the cylinder 59. The size of the cylinder 21 can be varied as desired, depending upon the weight of the boat to be loaded. When the pins 73 are in position, the trailer is held in running position and by removing the pins 73, the cylinder 59 can be used for lowering the trailer into loading position. The cylinder 59 is powered by means of carbon dioxide.

I claim:

1. A boat trailer comprising a pair of spaced parallel hollow tubes adapted to hold an expansible material, a cap detachably mounted on an end of each of said tubes, braces depending from said tubes, a pair of aligned casings arranged below said tubes and secured to said braces, a rod extending through said casings, spring brackets secured to said rod, axles supported by said spring brackets, wheels mounted on said axles, a cylinder positioned between said pair of tubes, a piston reciprocably mounted in said cylinder, a rod extending forwardly from said cylinder and secured to said piston, a first pulley mounted on the front of said rod, a cable trained over said pulley and having one end secured adjacent the front of said tubes, a crosspiece extending between the front ends of said tubes and secured thereto, a vertically disposed post extending upwardly from said crosspiece, a second pulley journaled in the lower portion of said post, an arm adjustably mounted in said post, a third pulley journaled in said arm, said cable being trained over said second and third pulleys and having a hook on an end thereof for engagement with a boat, a platform mounted above said tubes and including vertically disposed spaced parallel guide ribs for receiving therebetween the keel of a boat, a tank secured to one of said casings for holding a quantity of fluid, and conduit means connecting said tank to said tubes and cylinder, valve means for controlling the flow of material through said conduit means, a cross member extending between the rear ends of said tubes and secured thereto, a bracket on each end of said cross member, vertically disposed rods adjustably connected to said brackets, and bearing members secured to the upper ends of said rods for engagement with the bottom of the boat being handled.

2. The structure as defined in claim 1, and further including an inclined finger extending upwardly from said arm, and a steady rest extending from said finger.

3. A boat trailer comprising a pair of hollow tubes adapted to hold an expansible material, a cap detachably mounted on an end of each of said tubes, braces depending from said tubes, a pair of casings arranged below said tubes and secured to said braces, a rod extending through said casings, spring brackets secured to said rod, axles supported by said spring brackets, wheels mounted on said axles, a cylinder positioned between said pair of tubes, a piston reciprocably mounted in said cylinder, a rod extending forwardly from said cylinder and secured to said piston, a first pulley mounted on the front of said rod, a cable trained over said pulley and secured adjacent the front of said tubes, a crosspiece extending between the front ends of said tubes and secured thereto, a post extending upwardly from said crosspiece, a second pulley journaled in said post, an arm adjustably mounted in said post, a third pulley journaled in said arm, said cable being trained over said second and third pulleys and having a hook on an end thereof for engagement with a boat, a platform mounted above said tubes and including guide ribs for receiving therebetween the keel of a boat, a tank secured to one of said casings for holding a quantity of fluid, conduit means connecting said tank to said tubes and cylinder, valve means for controlling the flow of material through said conduit means, a cross member extending between said tubes and secured thereto, a bracket on each end of said cross member, rods adjustably connected to said brackets, and bearing members secured to said rods for engagement with the bottom of the boat being handled.

References Cited in the file of this patent
UNITED STATES PATENTS

| | | |
|---|---|---|
| 958,853 | Bulley | May 24, 1910 |
| 2,408,284 | Anthony | Sept. 24, 1946 |
| 2,558,418 | Brueckman | June 26, 1951 |
| 2,677,332 | Vollenweider | May 4, 1954 |
| 2,708,045 | Shontz | May 10, 1955 |
| 2,713,951 | Davies | July 26, 1955 |